Patented Aug. 10, 1948

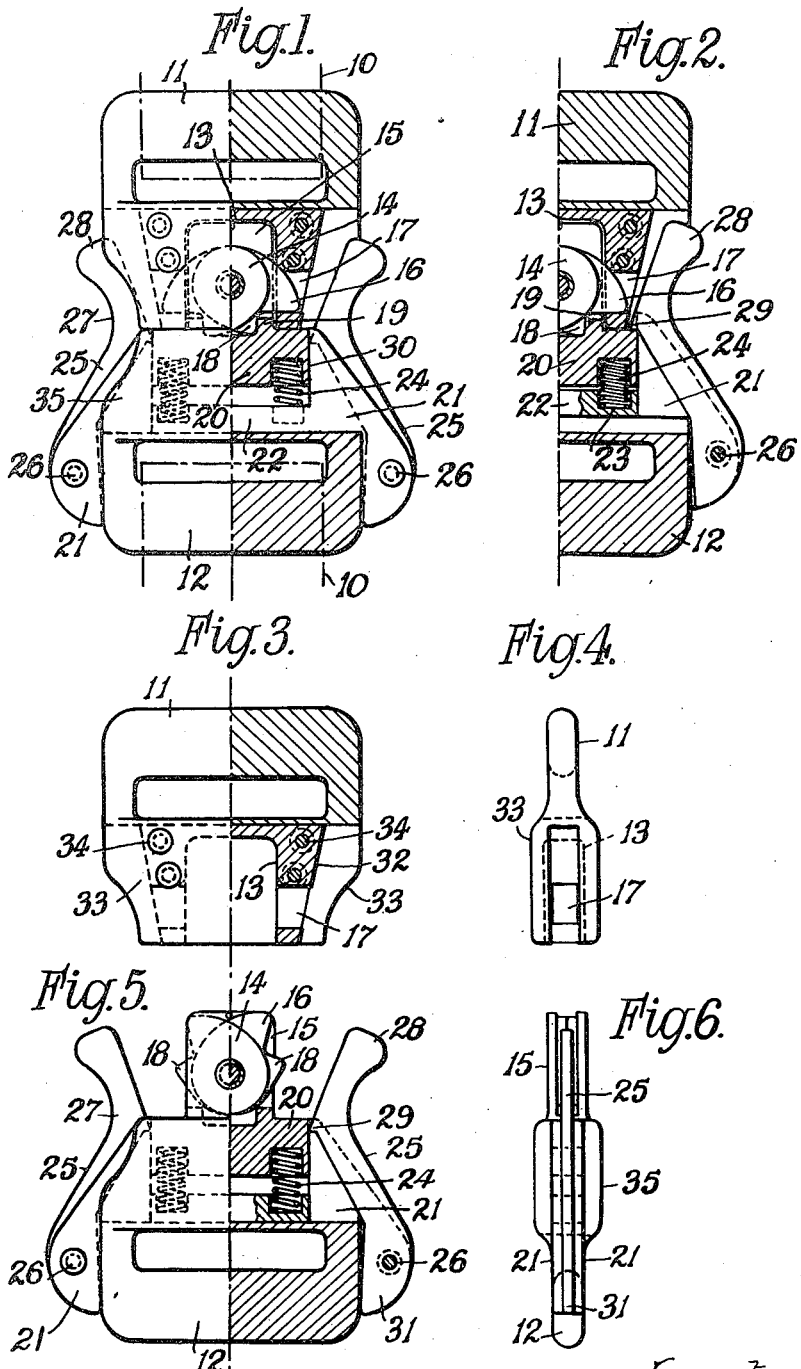

2,446,951

UNITED STATES PATENT OFFICE 2,446,951

DISCONNECTIBLE PUSH COUPLING

John Raymond Cuthbert Quilter, Woking, England

Application October 14, 1946, Serial No. 703,234
In Great Britain October 31, 1945

7 Claims. (Cl. 24—211)

This invention relates to disconnectible push couplings, particularly suitable for parachute harness for aviators, and of the general character described in U. S. Patent No. 2,164,447, dated July 4, 1939.

The invention has for its main object the provision of a disconnectible coupling of this character in which the release of the connections is accomplished by a conscious sequence of manual actions, the initial movement being an essential preliminary to the final movement of release, and all the movements being performed without difficulty even by thickly gloved hands and without shifting the grip.

A further object of the invention is to provide a disconnectible coupling of this character in which the movable locking slide is fitted with a pair of spring-biased levers pivoted thereon and projecting externally from the first-mentioned coupling member, these levers providing convenient means for manipulating both the said coupling member and the locking slide thereof, whereby the said coupling member can be guided into position relative to the other coupling member, and the locking slide can thereafter be moved axially of the coupling so as to release the retaining means and permit the disconnection of the coupling.

Other objects and advantages of the invention will hereinafter appear from the following description of a preferred embodiment, given with reference to the accompanying drawings, in which:

Fig. 1 is a half-sectional elevation of the improved coupling device in the engaged and locked position.

Fig. 2 is a detail showing the position of the parts after the preliminary movement and the automatic engagement of the gripping levers with the slide or locking means.

Fig. 3 is a half-sectional elevation and Fig. 4 an edge view of one coupling member, and Figs. 5 and 6 are corresponding views of the other coupling member, in the disengaged condition.

These drawings illustrate a construction embodying the present invention, as applied to a quick release coupling device of the character described in the preceding paragraphs, and particularly suitable for parachute harness. As shown in Fig. 1, two straps or webs 10 to be coupled together are attached to the remote ends of two coupling members 11, 12, of which the member 11 includes a socket 13 adapted to receive a pair of bell crank elements 14 pivotally mounted between cheeks 15 upon the other coupling member 12; each of these elements comprises a finger or arm 16 adapted to engage in a notch 17 in the wall of the socket, and a shoulder or second arm 18 which then comes into a position of alignment with the coupling axis, so that both shoulders can be shrouded by walls 19 upon a suitably shaped locking slide 20 movable parallel to that axis under the action of springs.

The slide 20 is mounted between two pairs of lugs 21 upon a crosshead 22, the middle portion of which is formed with recesses 23 for locating coiled biasing springs 24 pressing the slide 20 upwards therefrom; the lugs 21 overhang the sides of the coupling member 12 to guide the crosshead which is slidable in the axial direction of the coupling to a limited extent, against the pressure of the same biasing springs 24.

In the disengaged position of the coupling, the bell crank elements 14 are prevented from rotation by a stop pin or rivet extending between the cheeks 15 and by the pressure of the wall 19 against the curved faces of the shoulders 18. When the separated coupling members 11, 12 (see Figs. 3 and 5) are brought into engagement, the bell crank elements 14 are rotated automatically to engage the fingers 16 in the respective notches 17 of the socket, the rotation being produced by their shoulders 18 abutting against the mouth of the socket; the slide 20 is forced back by the curved faces of these shoulders engaging the walls 19 and it then moves forward, under the action of its springs 24, so as to shroud the shoulders 18 in their new position, thereby locking the coupling in engagement, as seen in Fig. 1.

Upon opposite sides of the second coupling member 12, a pair of gripping levers 25 are mounted upon pivot pins or rivets 26 located in the lugs 21 upon the crosshead 22, towards the rear end of the coupling member, the outer edges 27 of these levers being given a concave shape terminating in horns 28 which extend forward on each side of the projecting bell crank elements 14; this shape automatically gives the squeezing movement when the hand pushes on the concave parts 27 in seeking to release the coupling. The inner edges of the levers work in the gaps between the lugs 21, as seen in Figs. 2 and 5, and at the base of their horns they each comprise a square tooth 29 which normally rests against a keeper face 30 upon the locking slide, outward movement of the levers being limited by tail pieces or extensions 21 beyond their pivotal mountings 26.

In order to release the coupled straps or webs 10, the two gripping levers 25 are grasped and the crosshead 22 is lifted towards the co-operating member 11 until the teeth 29 on the inner edges of the levers rise up the keeper face 30 and snap over the top of the slide 20 under the pressure exerted by the hand. The slide 20 can now be drawn downwards, and the members 11, 12 separated, as soon as release is desired, the walls 19 being first pulled clear of the shoulders 18 on the bell crank elements and the latter then yielding to the pull by rotating to draw the fingers 16 out of the notches 17 in the socket. This rotation brings the shoulders 18 up to the position (see Fig. 5) for subsequent re-engagement, the bell crank elements being held in this position by the slide 20 which moves forward into contact with them, pushing aside the gripping levers 25 as soon as the pressure upon the latter is relieved.

The initial movements of lifting the member 22 and engaging the slide 20 by gripping the levers 25 can be regarded as cocking the quick release device so that it will be ready for action at the chosen moment, the final movement of release being assisted by the partial or proportional relief of load upon the coupling member 12 carrying the bell crank elements.

Engagement of the coupling is facilitated by the horns 28 of the gripping levers, which are shaped to form convergent parts adapted to guide the co-operating coupling member 11 into place, the socket 13 on the latter being conveniently made of tapered external shape for the same purpose. As shown in Figs. 3 and 4, the socket may be of U-shape, having its side walls tapered externally at 32, these walls being formed with the notches 17; the socket is fitted tightly between the cheeks 33 of the coupling member and secured thereto by rivets 34, portions of the cheeks beyond the socket walls providing between them gaps to accommodate the horns 28 of the gripping levers.

The coupling member 12 has its crosshead 22 fitted between cheeks 35 of similar design, but in this case the crosshead is slidable axially of the coupling to allow the preliminary and final movements for release; the pressure of the springs 24 normally maintains the crosshead seated in the position of Figs. 1 and 5, its lift being limited by the clearance beneath the slide 20, which is itself retained by the bell crank elements 14.

The shape of the coupling members 11, 12 may evidently be varied to suit the straps or other connections to be coupled together; for example, instead of the member 11 being provided with a bar for attachment of the looped end of a strap, such as the lift web of a pilot's harness, this member might be provided with a spring-guided hook having its shank integral with a socket riveted between a pair of flat cheek plates, the hook being adapted for attachment to a harness such as worn by the observer on an aircraft.

What I claim is:

1. A disconnectible push coupling, comprising two coupling members, retaining means upon one of said members for engaging the other of said members, a spring-biased slide upon said one member normally locking said retaining means in engaged position, and spring-biased releasing means mounted upon said one member, said releasing means being adapted for sliding movement axially of the coupling and independently of said slide, and spring biasing means common to said slide and said releasing means.

2. A disconnectible push coupling, comprising two coupling members, retaining means upon one of said members for engaging the other of said members, a spring-biased slide upon said one member for locking said retaining means in engaged position, and spring-biased releasing means mounted upon said one member, said releasing means comprising a crosshead slidable within said one member independently of said slide, lugs projecting from said crosshead, a pair of levers projecting externally from said one member, and pivots supporting said levers upon said lugs, each of said levers including a tooth normally pressing against one end of said slide but adapted to engage over a corner of said slide after a preliminary sliding movement of said releasing means axially towards said other member.

3. A disconnectible push coupling, comprising two coupling members, retaining means upon one of said members for engaging the other of said members, a spring-biased slide upon said one member for locking said retaining means in engaged position, and spring-biased releasing means mounted upon said one member, said releasing means comprising a crosshead slidable within said one member independently of said slide, lugs projecting from said crosshead, a pair of levers projecting externally from said one member, and pivots supporting said levers upon said lugs, each of said levers including a tooth normally pressing against one end of said slide but adapted to engage said slide after relative sliding movement of said crosshead and said slide.

4. In a disconnectible coupling of the character described, manipulating means mounted upon one coupling member, comprising a pair of levers projecting from opposite sides of said one member, a slide and a crosshead independently slidable within said one member and axially of the coupling, spring means pressing said slide and crosshead apart, and pivotal connections between said levers and crosshead, said slide including means for locking the coupling members in connected position, and each of said levers including a tooth normally pressing against one end of said slide but adapted to engage over a corner of said slide after a preliminary sliding movement of said levers and crosshead towards the other coupling member.

5. In a disconnectible coupling of the character described, manipulating means mounted upon one coupling member, comprising a pair of levers projecting from opposite sides of said one member, a slide and a crosshead independently slidable within said one member and axially of the coupling, spring means pressing said slide and crosshead apart, lugs projecting from said crosshead, and pivots supporting said levers upon said lugs, each of said levers including a tail extending beyond the respective pivot and adapted to engage the side of said one member for limiting the pivotal movement of the lever and a tooth normally pressing against one end of said slide but adapted to engage over a corner of said slide after a preliminary sliding movement of said levers and crosshead towards the other coupling member.

6. In a disconnectible coupling of the character described, manipulating means mounted upon one coupling member, comprising a pair of levers projecting from opposite sides of said one member, said levers having concave outer faces terminating in horns projecting towards the other coupling member, a slide and a crosshead independently slidable within said one member and axially of the coupling, spring means pressing said slide and crosshead apart, and pivotal connections between said levers and crosshead, said slide including means for locking the retaining means of said coupling members in connected position, and each of said levers including a tooth normally pressing against one end of said slide but adapted to engage over a corner of said slide after relative movement of said crosshead and said slide, the concave faces and horns of said levers enabling them to be grasped manually for engaging said one member with said other member and also for sliding said levers and crosshead towards said other member.

7. In a disconnectible coupling of the character described, the combination of two bell crank elements rotatably supported on one of the coupling members, the other coupling member being recessed for engagement by an arm of each said bell crank element, a slide movable upon said one coupling member, said slide including means for locking said bell crank elements in engagement with said other coupling member, and said locking means co-operating with the second arm of each said bell crank element, spring means urging said slide towards said bell crank elements to bring said locking means into co-operative relation therewith, and pivoted levers slidably mounted upon said one coupling member for movement axially of the coupling, said levers being engageable with said slide by a movement towards said other coupling member and a subsequent pivotal movement.

JOHN RAYMOND CUTHBERT QUILTER.

REFERENCES CITED

The following references are of record in the file of this patent:

UNITED STATES PATENTS

| Number | Name | Date |
|---|---|---|
| 1,898,155 | Tripp | Feb. 21, 1933 |
| 2,164,447 | Clarke | July 4, 1939 |

FOREIGN PATENTS

| Number | Country | Date |
|---|---|---|
| 483,783 | Great Britain | Apr. 26, 1938 |